A. MACRIS.
WINDMILL.
APPLICATION FILED SEPT. 28, 1906.

910,701.

Patented Jan. 26, 1909.
3 SHEETS—SHEET 1.

Witnesses:
Wm. R. Andrews
Joseph D. Wright

Inventor,
Anastasios Macris
By John A. Saul
Atty.

A. MACRIS.
WINDMILL.
APPLICATION FILED SEPT. 28, 1906.

910,701.

Patented Jan. 26, 1909.
3 SHEETS—SHEET 2.

Witnesses:
Wm. R. Andrews
Joseph D. Wright

Inventor,
Anastasios Macris,
By John A. Saul
Atty

A. MACRIS.
WINDMILL.
APPLICATION FILED SEPT. 28, 1906.
910,701.
Patented Jan. 26, 1909.
3 SHEETS—SHEET 3.
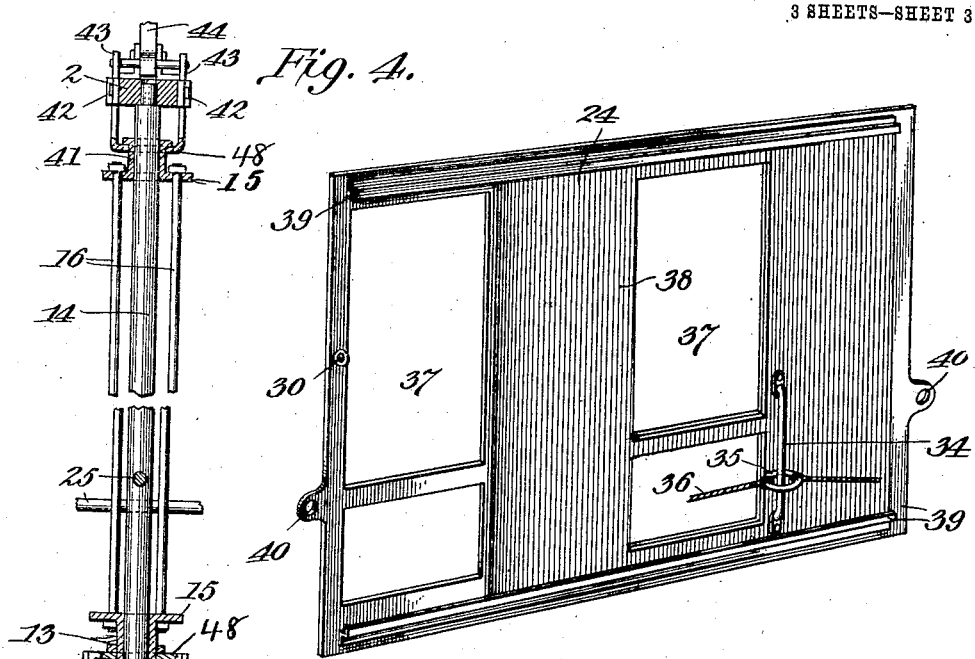
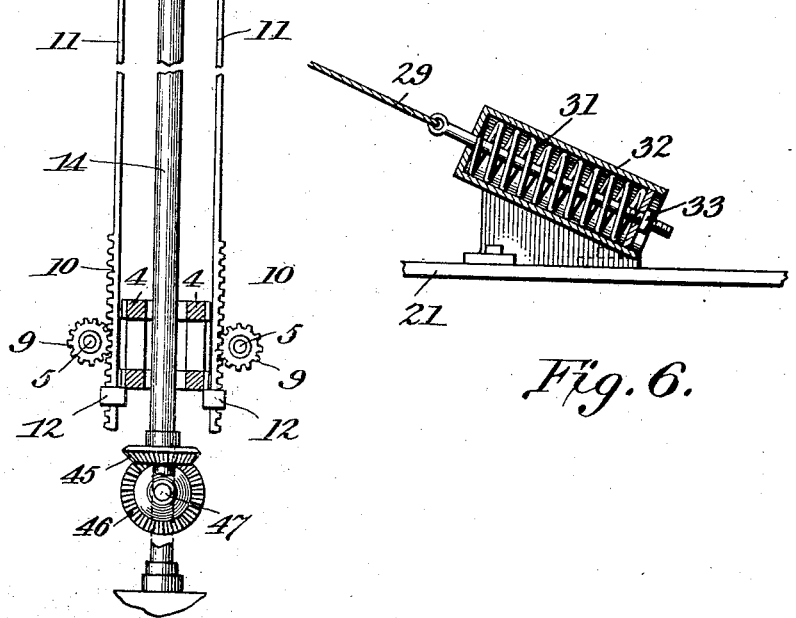
Witnesses:
Wm. R. Andrews
Joseph D. Wright
Inventor;
Anastasios Macris
By John A. Saul
Atty.

UNITED STATES PATENT OFFICE.

ANASTASIOS MACRIS, OF JUNEAU, DISTRICT OF ALASKA.

WINDMILL.

No. 910,701.      Specification of Letters Patent.      Patented Jan. 26, 1909.

Application filed September 28, 1906. Serial No. 336,651.

*To all whom it may concern:*

Be it known that I, ANASTASIOS MACRIS, a citizen of the United States, residing at Juneau, in the District of Alaska, have invented certain new and useful Improvements in Windmills, of which the following is a specification My invention relates to windmills; and has for its object to so construct the same, that the parts composing the mill may be easily and cheaply manufactured; and the structure readily assembled, when desired A further object is to so construct the vanes of the mill that the surface thereof may be increased or decreased at pleasure; and the controlling mechanism of said vanes be so constructed as to take up shock due to constant change in the position of the same.

Figure 1:
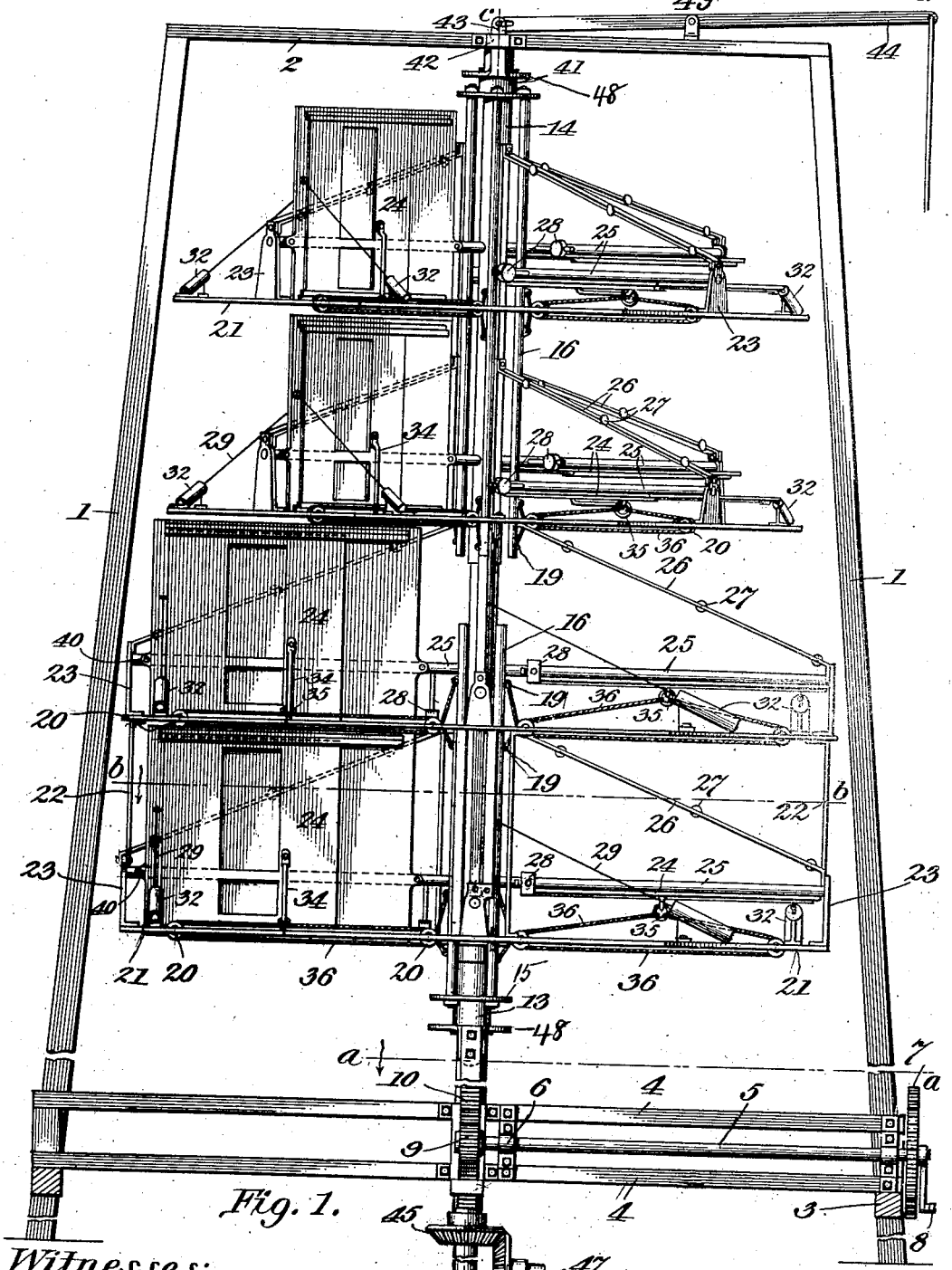
Figure 2:
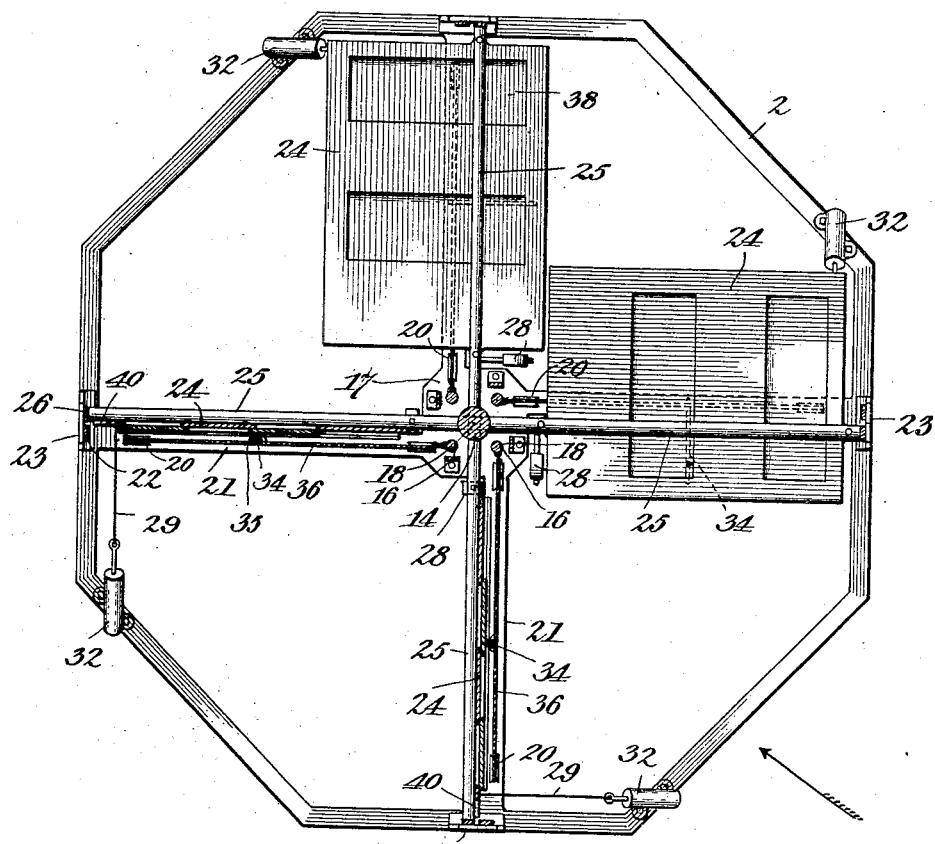
Figure 3:
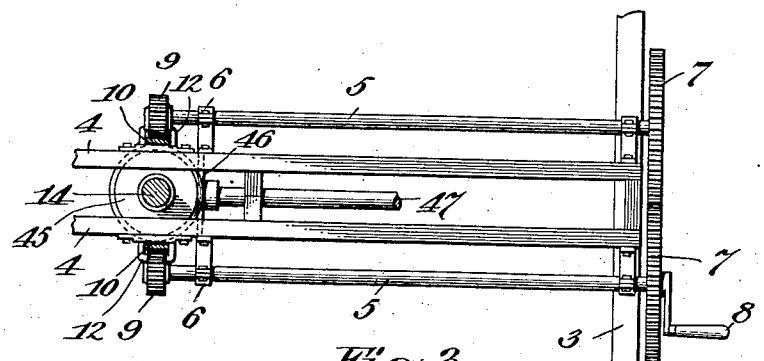

In the drawings forming a part of this specification, and in which like symbols of reference represent corresponding parts in the several views: Figure 1 is an elevation of my device; Fig 2 a plan view of the same, on the line *b—b*, Fig 1; Fig 3 a plan, on the line *a—a*, Fig 1; Fig 4 a vertical section of the main supporting shaft, on the line *c—c*, Fig 1; Fig. 5 a view of one of the vanes; and, Fig. 6 a view of one of the springs connected to the vanes.

1 represents the vertical standards of the main frame; 2 the cross-pieces at the top of same; and 3 the cross-pieces of the bottom of the structure.

4 are bars forming a supporting framework at the base of the mill, the same being in turn supported on the cross-pieces 3; 5 shafts supported by straps 6, the same supporting bearings for the shafts; and 7 gears on said shafts, which mesh with each other and are adapted to be operated by a crank 8. There are two of these shafts 5 one supported on each side of the frame.

9 are pinions on the ends of shafts 5, the same meshing with rack-bars 10, on rods 11; and 12 are guides for the rack-bars.

13 and 41 are sleeves riding on the main shaft 14 and revolving therewith and within the rings 48, said sleeves carrying annular flanges 15, supporting rods 16; and 17 is a platform surrounding and carried by the main shaft 14. 18 are openings in said platform to receive and guide the rods 16.

19 are screw eyes in the rods 16; 20 pulleys supported in horizontal arms 21 extending from platforms 17; 22 vertical supporting braces, connected to short supporting rods 23, and in turn connected to the arms 21.

24 are the vanes of the device; 25 shafts supporting the same, said shafts passing through the main shaft 14 and journaled in bearings in the arms 23; 26 rods connected to the underside of platforms 17, and having their outer ends connected to short arms 23; and 27 are cushions on said rods 26, against which the vanes contact when in their upright or operative position.

28 are counterbalances connected to the shafts 25 to balance the weight of the vanes; 29 cords connected to the vanes by screw eyes 30, and having their outer ends connected to springs 31, in boxings 32; and 33 are nuts to adjust the tension of said springs. The object of the springs is to take-up shock, and also to have a slight tendency to throw the vanes out of operative position, or depress the same.

34 are staples on the vanes; 35 rings sliding on the same; 36 ropes connected to the sides of the rings and passing over the pulleys 20; and 37 openings in the vanes. 38 are shutters adapted to close the openings in the vanes; said shutters sliding in ways 39 in the vanes; and 40 eyes in the shutters for reception of screws or the like, to connect the same to the shafts 25.

41 is a reciprocating sleeve at top of the main shaft 14, corresponding to sleeve 13; 42 straps for reception of ears 43; 44 a lever connected to said ears, and to a fulcrum 49, the office of said lever being to raise sleeve 41 and with it the rods 16 to actuate the same and operate the ropes; and thus open the shutters 38. The lower series of shutters is operated by the crank 8, the pinions operating on the rack-bar raising the poles 16 in a similar manner.

45 is a gear at the base of main shaft 14, and 46 a similar gear on shaft 47, the latter shaft applying the power where desired.

The operation of the device will be apparent from the foregoing:—The vanes being connected to the shafts eccentrically, two thirds of their surface being above the shaft, when acted upon by the wind assume a vertical position, but having passed to the return position immediately falls, the weights tending to normally balance the same. When more power is desired on the vanes the shutters are closed, or if a reduction of power is desired they are opened by the manipulation of the crank or lever, as desired.

Of course I may make my device with any number or size of vanes, and the series may be increased to any number desired. The upper series of vanes are disposed in a plane between, or at right-angles to the lower. The shafts of the vanes go through the main shaft, so that as one end of the shaft is in operative position the other is inoperative. The mill is divided into independent sections, so that mills of more than twenty horse power may be built, and each section may be regulated by its own device, and in case one section is injured the other is unaffected.

Having now fully described my invention, what I claim as new and desire to secure by Letters-Patent, is:—

1. In a windmill, a main supporting shaft, arms connected to the same, vanes on the arms, means for increasing the effective area of the vanes, rods to support the vanes, and cushions on the rods.

2. In a windmill, a main supporting shaft, horizontal arms extending from the same, an independent pair of vanes on said arms operated automatically by the wind vanes provided with openings and shutters adapted to close the openings, cords having connection with the shutters, pulleys upon which the cords operate, radial arms supporting the pulleys, and a series of rods to which said ropes or cords are attached and adapted to be operated.

In testimony whereof I affix my signature in presence of two witnesses.

ANASTASIOS MACRIS.

Witnesses.
   H. J. SWEENEY,
   J. A. SAUL.